April 14, 1970    F. E. DAHLEM    3,505,792
SELF-CLEANING FILTER
Filed July 8, 1968    2 Sheets-Sheet 1
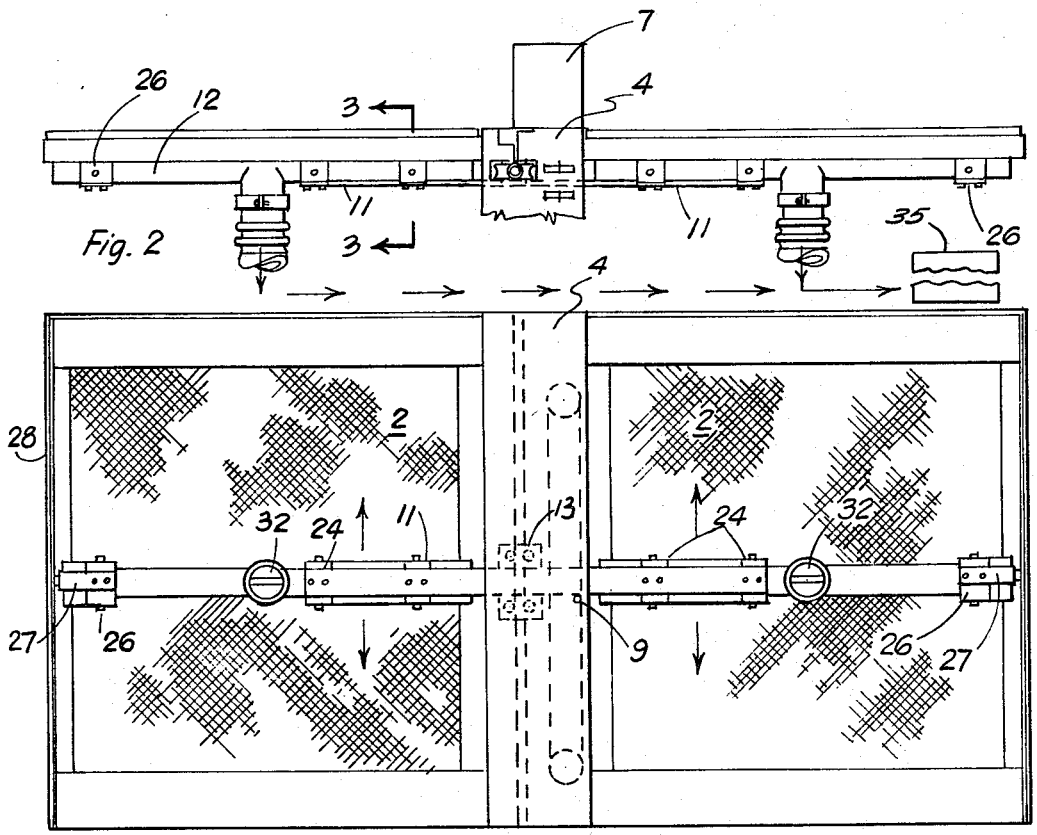
Fig. 2
Fig. 1
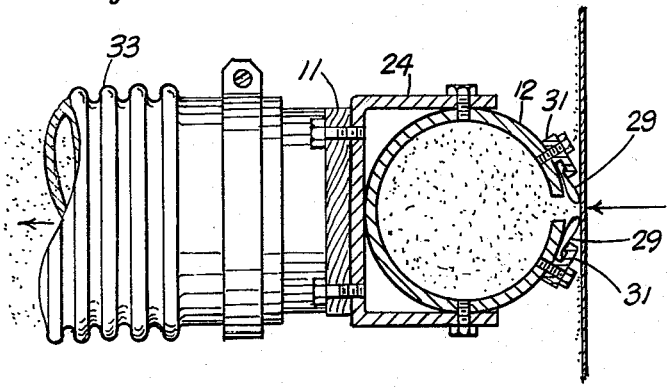
Fig. 3
INVENTOR.
Francis E. Dahlem
BY Ralph C. Brick

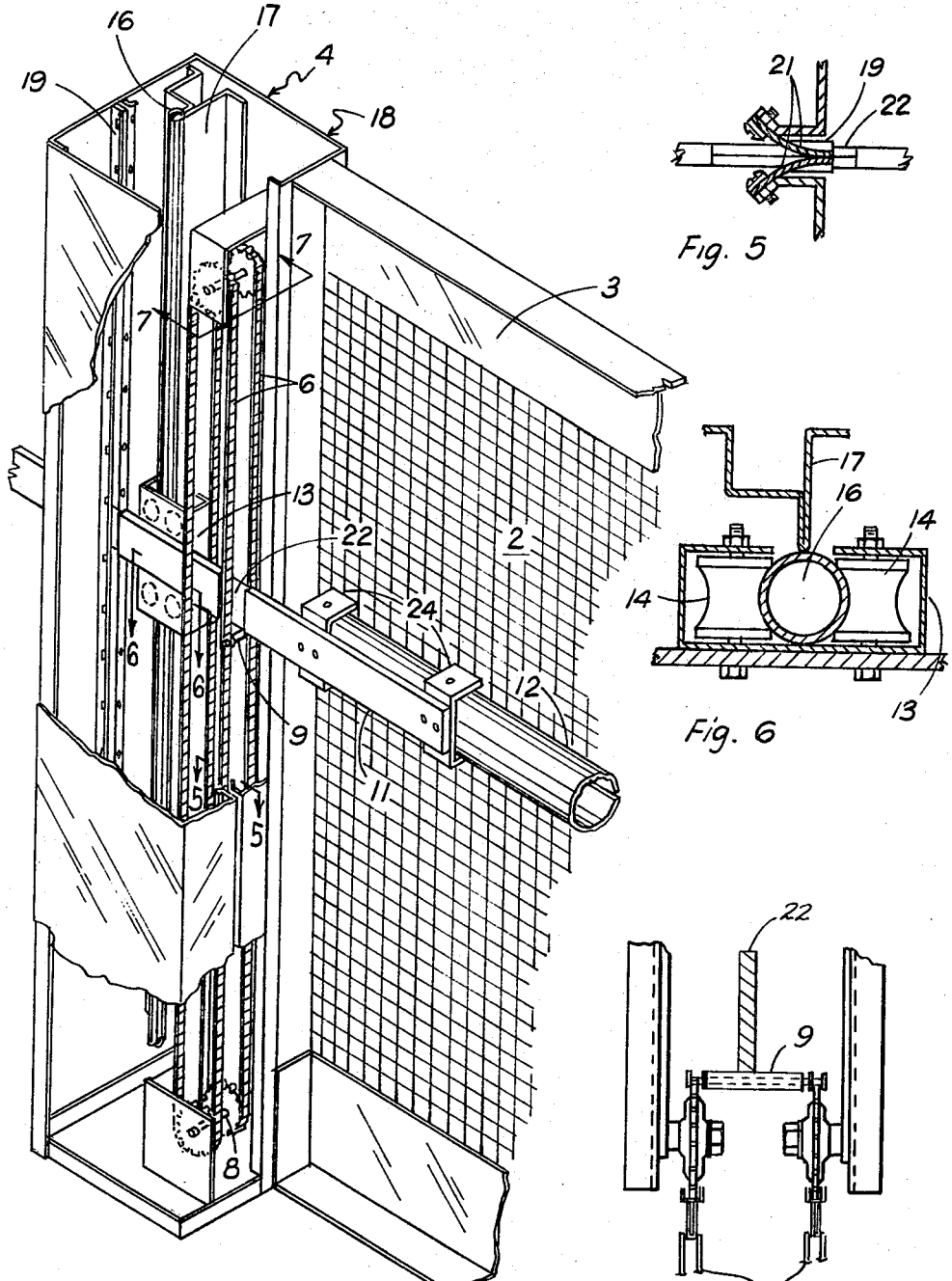

United States Patent Office 3,505,792
Patented Apr. 14, 1970

3,505,792
SELF-CLEANING FILTER
Francis E. Dahlem, Louisville, Ky., assignor to American Air Filter Company, Inc., Louisville, Ky., a corporation of Delaware
Filed July 8, 1968, Ser. No. 743,171
Int. Cl. B01d 41/00
U.S. Cl. 55—294                                      5 Claims

ABSTRACT OF THE DISCLOSURE

An improved self-cleaning filter apparatus including a filtering screen, a slotted scanning tube for cleaning the screen, and a continuous conveyor assembly for reciprocating the scanning tube over the filtering screen surface in cantilever supported fashion from one side of the filtering screen.

BACKGROUND OF THE INVENTION

The present invention pertains to fluid filtration and finds particular utility in the gas separation art wherein particulate materials are separated from a gaseous stream by utilization of a filtering screen extending transverse the gaseous stream to be treated with the collected contaminants on the filtering screen being removed by reciprocating slotted scanning tube means.

Various types of apparatus are known in the art of gas filtration for removing particulate materials collected on the filtering screens of gas filter apparatus. A number of these arrangements have included a longitudinally slotted scanning tube positioned adjacent the surface of a filtering screen, the tube being reciprocated to and fro over the filtering screen surface. To effect reciprocation of the scanning tube in past arrangements, the tube has been supported at its opposite ends between a pair of endless spaced conveyors positioned in substantially spaced apart aligned relation at opposed ends of the filter screen. To move the tube in a uniform manner along the surface of the filtering screen, it has been necessary to drive the pair of opposed endless conveyors simultaneously through an extended drive system. Such an arrangement has created problems in torque and misalignment and has been expensive in construction, operation, and maintenance. Further, the drive system has necessarily occupied valuable space, and by its presence in the gas stream has created additional resistance to the flow of the gas stream.

SUMMARY OF THE INVENTION

The present invention provides an improved, straightforward, self-cleaning filter apparatus including a novel arrangement for reciprocating a contaminant removing slotted scanning tube. The apparatus of the present invention is economical in construction and maintenance, requires a minimum of moving parts, occupies a minimum of space, and avoids past problems of torque and misalignment. In addition, the apparatus of the present invention avoids undesirable contaminant entrainment in the reciprocating mechanism itself, and at the same time, provides an enclosed stable guide arrangement for the reciprocating slotted tube. Further, the apparatus of the present invention insures effective sealed engagement of the reciprocating tube with the surface of the filtering screen, the composition of the filtering screen and the sealing mechanism adjacent the slotted portion of the tube permitting efficient filtration with minimum wear.

Various other features of the present invention will become obvious to one skilled in the art upon reading the disclosure set forth hereinafter.

More particularly, the present invention provides a self-cleaning filter apparatus for removing contaminant materials from a dirty gas stream comprising: filtering screen means disposed transversely across a dirty gas stream to be treated; a longitudinally slotted scanning tube means having the slot thereof positioned adjacent the surface of the screen to clean the screen means; and reciprocating means for moving the scanning tube means to and fro over the surface area of the screen means, the reciprocating means including a pair of spaced parallel continuously moving endless members extending along one side of the screen means in coupled relation for synchronous movement and lift pin means connected between the endless members to engage against the scanning tube means extending therefrom in cantilever fashion to reciprocate the scanning tube means.

It is to be understood that various changes can be made in the arrangement, form, and construction of the apparatus disclosed herein without departing from the scope or spirit of the present invention.

Referring to the drawings which disclose one advantageous embodiment of the present invention;

FIGURE 1 is a front elevational view of a pair of side-by-side filtering screens incorporating the novel slotted scanning tube arrangement of the present invention;

FIGURE 2 is a top plan view of the apparatus of FIGURE 1;

FIGURE 3 is an enlarged cross-sectional view of the scanning tube taken in a plane passing through line 3—3 of FIGURE 2;

FIGURE 4 is an enlarged, partially broken away, isometric view of a portion of the apparatus of FIGURES 1–3 disclosing details of the novel endless conveyor and guide mechanism;

FIGURE 5 is an enlarged cross-sectional view taken in a plane passing through line 5—5 of FIGURE 4, disclosing the sealing arrangement for the longitudinally extending slots of the housing which encases the endless drive mechanism;

FIGURE 6 is an enlarged cross-sectional view taken in a plane passing through line 6—6 of FIGURE 4, disclosing details of the guide mechanism for the scanning tube; and FIGURE 7 is a sectional view taken in a plane through line 7—7 of FIGURE 4 disclosing the stub shaft arrangement at the upper portion of the endless conveyor assembly.

Referring to FIGURES 1 and 2 of the drawings, the novel filter apparatus of the present invention is disclosed as including a pair of side-by-side filtering screens 2 mounted in suitably rigid frames 3 not described in detail herein. Advantageously, filtering screens 2, which are arranged to extend transversely across a dirty gas stream to be treated, are made of polypropylene material of open weave having a mesh of 34 by 24. Such material not only presents minimum friction to the seal associated with the slot of the scanning tube, as described hereinafter, but such material also affords highly efficient filtering properties in the removal of lint contaminants in areas such as textile mills.

Positioned in proximity to adjacent sides of the side-by-side screens 2 is a novel longitudinally extending endless conveyor arrangement, broadly designated by reference numeral 4. Conveyor arrangement 4, as can best be seen in FIGURE 4, includes a pair of spaced parallel continuously movable endless conveyors 6. Conveyors 6 can be of the chain link type as known in the art. Conveyors 6 advantageously are driven simultaneously by means of a suitable drive motor 7 (FIGURE 2) and coupling drive shaft 8. It is to be noted at FIGURE 7 that the upper sprockets of each endless conveyor 6 is mounted separately on its own stub shaft so that a space is provided between opposed stub shafts to permit passage therebetween of cantilevered support arm 11 described immediately hereinafter. Connected between one of the two parallel flights of conveyors 6 is lift pin 9. A suitable bearing brass roller can be rotatably mounted on lift pin 9 to engage against cantilevered support arm 11, which, in turn, serves to support slotted scanning tubes 12 described hereinafter. Support arm 11 has fastened thereto roller carriage 13 which supports in rotatable fashion thereon two pairs of opposed concave rollers 14 (FIGURE 6). Rollers 14 engage between their concaved surfaces a longitudinally extending cylindrical guide member 16, which is supported by longitudinally extending h-shaped channel 17. Channel 17, in turn, is fastened to the inner wall of the longitudinally extending housing 18.

Housing 18, which is substantially rectangular in cross section, serves to protect the conveyor and guide assembly from contaminant particles in the gaseous stream being treated. To effectively accomplish this, housing 18 is provided with a pair of aligned longitudinally extending slotted passages 19 disposed in opposed side walls thereof through which slotted passages cantilevered support arm 11 projects. Each slotted passage 19 has fastened thereto a pair of faced, flexible sealing strips 21 (FIGURE 5) which surround ax-head contoured portion 22 of support arm 11. With this arrangement, support arm 11 can be moved in reciprocatory fashion to and fro along the longitudinal axis of conveyors 6 with seals 21 preventing any leakage of contaminant laden gases into housing 18, the support arm passing between the space between endless stub shafts as lift pin 9 passes at the upper portion of the conveyor assembly from one flight of the assembly to the other, the support arm resting on the shaft 8 or a suitable stop member about drive shaft 8 at the lower portion of the conveyor assembly (not shown in detail).

As will be noted in FIGURE 4 of the drawings, each end of support arm 11 is provided with suitable U-brackets 24, these brackets serving to support scanning tube 12. An additional bracket 26 is provided at the opposite end of scanning tube 12, bracket 26 in turn carrying a roller support arm 27 which cooperatively engages in slotted guide channel 28 at the end of filter screen 2 (not disclosed in detail).

Each longitudinally slotted scanning tube 12 is provided with opposed longitudinally extending flexible seals 29 fastened to the sides of the slot by means of holddown clamps 31 (FIGURE 3). Advantageously, seals 29 are made of flat nylon material folded back upon itself, the nylon seals 29 serving to insure a suitable sealing between the surface of the polypropylene filter screen and the slot of the scanning tube 12, and at the same time provide a minimum of friction and a minimum of wear. It is to be noted that each of scanning tubes 12 is provided with a suitable outlet aperture 32 to which is connected a suitable flexible duct 33 leading to a suitable vacuum pump (not shown).

It will be obvious from the aforegoing description that as scanning tubes 12 are moved to and fro over the surface of the filtering screens 2, the vacuum pump will serve to remove the particles of contaminant material collected on filtering screen for appropriate disposal. It also will be obvious from the aforegoing description, that a suitable limit switch can be associated with conveyors 6 and motor 7 to stop the motor in accordance with a preselected pressure differential measured by suitable pressure differential mechanism adjacent the upstream and downstream sides of filter screens 2.

The invention claimed is:

1. A filter apparatus for removing contaminant particulate materials from a dirty gas stream comprising: planar filtering screen means disposed transversely across flow of a dirty gas stream to be treated; a longitudinally slotted scanning cleaning tube means connected to a suitable vacuum source and having the slot thereof positioned adjacent the surface of said screen means, the slot of said slotted cleaning tube means extending substantially the breadth of said filtering screen means to clean said screen means; reciprocating means for moving said scanning tube means to and fro over the surface area of said screen means, said reciprocating means including a pair of spaced parallel continuously moving endless members extending along only one side of said screen means in coupled relation for synchronous movement and lift pin means connected between said endless members to engage against said scanning tube means extending therefrom in cantilever fashion to reciprocate said scanning tube means; and longitudinal guide member means extending parallel said endless members along said one side, said scanning tube means having rollers mounted in engaging relationship with said guide member means.

2. The apparatus of claim 1, said endless members being surrounded by a longitudinally extending enclosed housing having longitudinally extending sealed slot means along a side wall thereof through which said scanning tube means extends.

3. The apparatus of claim 1, said scanning tube means having opposed flexible seals extending along opposite sides of the longitudinal slot to engage against the surface of said filtering screen means.

4. The apparatus of claim 1, said filtering screen means including a pair of filtering screens disposed in side-by-side relationship across the dirty gas stream to be treated; said endless conveyor members being positioned in proximity to adjacent sides of said side-by-side filter screens.

5. The apparatus of claim 1, said scanning tube means having opposed flexible nylon seals extending along opposite sides of the longitudinal slot to engage against the surface of said filtering screen means, said filtering screen means being of polypropylene material of 34 by 24 mesh.

References Cited

UNITED STATES PATENTS

| 2,594,957 | 4/1952 | Martens | 55—294 |
| 2,776,024 | 1/1957 | Fowler | 55—294 |
| 3,147,098 | 9/1964 | Honan et al. | 55—294 |
| 3,166,391 | 1/1965 | Keser | 55—294 |
| 3,306,012 | 2/1967 | Wallin | 55—294 |
| 3,339,348 | 9/1967 | Bratton et al. | 55—294 |
| 3,377,780 | 4/1968 | Noland | 55—294 |

HARRY B. THORNTON, Primary Examiner

B. NOZICK, Assistant Examiner

U.S. Cl. X.R.

55—302, 528